Jan. 26, 1932. G. S. FABER 1,842,902

VALVE

Filed Dec. 6, 1928

Witness:
William P. Kilroy

Inventor
Guy S. Faber
Hill & Hill
By Attys

Patented Jan. 26, 1932

1,842,902

UNITED STATES PATENT OFFICE

GUY S. FABER, OF CHICAGO, ILLINOIS, ASSIGNOR TO JAS. P. MARSH & COMPANY, OF CHICAGO, ILLINOIS, A CORPORATION OF ILLINOIS

VALVE

Application filed December 6, 1928. Serial No. 324,251.

My invention relates to improvements in valves, and more particularly it relates to valves that may be opened and closed by actuating a disk to and from its position on a valve seat. Valves of this type may be made either with solid or renewable disks. Such disks, if made solid, are usually constructed of brass, and if renewable, they are constructed of soft metal, asbestos, or packing of some kind. Either class of disks requires their removal, after a period of use, either for the purpose of grinding as in the case of the solid disks to make the disks fit their seat snugly or as in the case of the renewable disks, that they may be replaced by new ones.

Such valves are frequently mounted in a pipe line or in a conduit in positions which are difficult of access, or where their continuous control of the pipe or conduit is desirable and their removal for renewal or for grinding would require a temporary suspension of operations during the time required for such grinding or replacement.

One of the objects of my invention is to provide a valve construction of the kind described in which the normally active valve disk can be removed for the purpose of repair or replacement without hindering or interfering with the control by the valve mechanism of the pipe or conduit in which the valve is mounted.

Another object of the invention is the provision of a device that is simple, compact, convenient and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Figure 1:
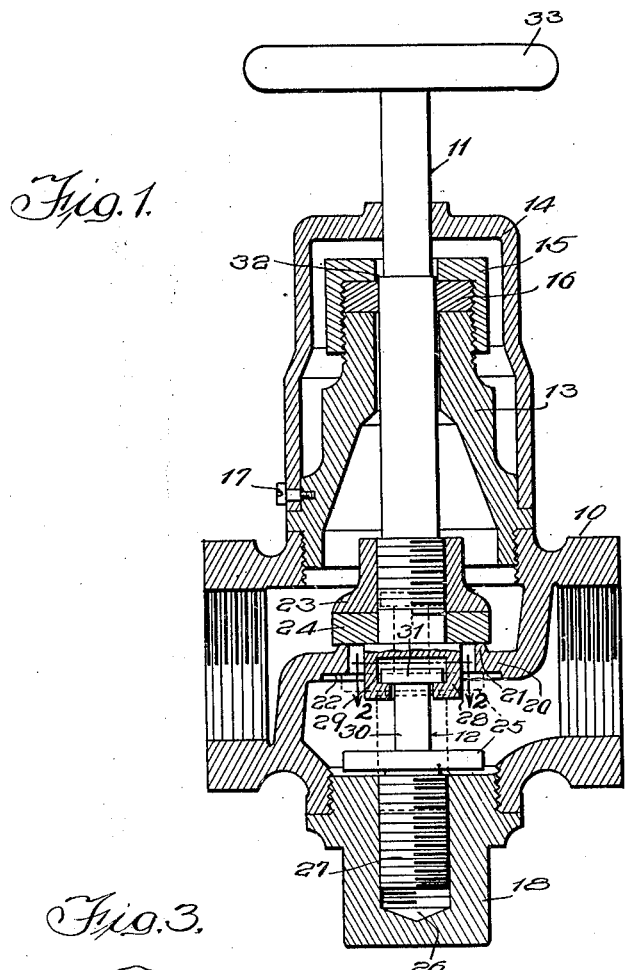
Fig. 1 is a longitudinal sectional view through a valve equipped with the device of my invention.
Figure 3:
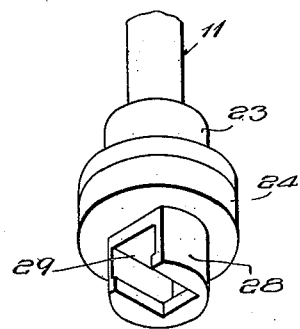
Fig. 3 is a perspective view of a portion of the valve mechanism in which my invention is embodied.
Figure 2:
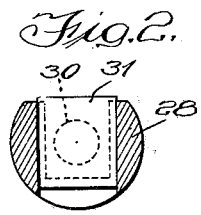
Fig. 2 is a view along the line 2—2 of Fig. 1.

Referring now to the drawings, the number 10 generally designates a valve casing of the type commonly known as globe valves, in which I have chosen to illustrate one embodiment of my invention. The valve casing 10 has a threaded connection at each end which adapts it for installation in a pipe line or a conduit. At substantially the midportion of the valve casing 10 is an annular diaphragm or partition 20 which provides a double-faced valve seat. The diaphragm 20 is so constructed that one of its sides forms a primary valve seat 21 and the other side forms a supplementary valve seat 22.

The valve is normally opened and closed by rotating a spindle 11 by means of a wheel 33, the rotation of the spindle serving to move a valve disk 24 to open or closed position on the seat 21 in a manner hereinafter more particularly described. The spindle 11 is threaded into the disk 24 and a nut 23, the connection being sufficiently tight that rotation of the spindle likewise rotates the disk 24 and the nut 23. When the valve mechanism is disassembled the nut 23 and the disk 24 can be removed from the spindle 11 by the use of a wrench or the like, if desired.

A bonnet 13 has a threaded connection with the valve casing 10 and provides a guide for the spindle 11. A packing plate 16 is positioned on the upper end of the bonnet 13 and is capped by a stuffing box 15 which is threaded over the plate and on to the end of the bonnet. A hood member 14 is fastened to the bonnet 13 by means of a plurality of screw bolts 17. The spindle 11 extends through the bonnet 13, the plate 16 and the stuffing box 15.

On the side of the valve casing 10 opposite to the supplementary valve seat 22, I have mounted an elongated plug 18 in axial alignment with the spindle 11. The plug 18 has a threaded connection with the casing 10 for easy removal of the plug when necessary. A bore 26 in the plug 18 serves as a mounting for one end of a supplementary spindle 12. The spindle 12 is axially aligned with the spindle 11 and forms therewith a two section spindle which is rotatable as a unit to open and close the valve. The bore 26 is interiorly threaded for engagement with the lower threaded portion 27 of the supplementary spindle 12.

For the purpose of securing unitary action of the spindles 11 and 12 and also to permit of their easy disengagement when desired, I have provided a joint comprising a hollow cylindrical shaped member 28 which projects downwardly from the main valve disk 24. The member 28 is preferably integrally formed with the disk 24. The interior of the member 28 provides a rectangular shaped aperture 29 which has a full sized opening laterally and a restricted opening in the end of the member 28. A rectangular head 31 is provided on a stem 30 on the upper end of the supplementary spindle 12. The aperture 29 is adapted to receive the cap member 31 through its lateral opening and thereby provides for cooperative engagement between the spindles 11 and 12. The stem 30 has relatively small lateral dimensions which permit it to enter the restricted opening in the end of the member 28. The transverse dimension of the cap member 31 is greater than that of the restricted opening in the end of the member 28, so that the spindles 11 and 12 are fastened together longitudinally. The depth of the aperture 29 is made sufficiently greater than the thickness of the cap member 31 to permit of a slight tilting of the spindle 11 relative to the spindle 12 and the easy engagement and disengagement of the spindles. The main spindle 11 and the supplementary spindle 12 are thus adapted for cooperative engagement by inserting the cap 31 into the aperture 29, the spindles 11 and 12 thereby acting as a single member. When the device is assembled, it is obvious that by rotating the spindle 11 by means of the wheel 33, the spindle 12 will likewise be rotated, and by reason of the threaded connection of the spindle 12 with the plug 18, both of the spindles will be moved longitudinally as a unit by said rotation.

Figure 4:
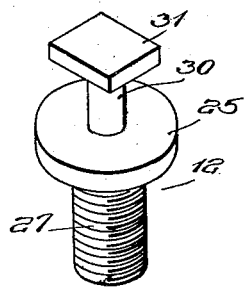
Fig. 4 is a perspective view of still another portion of the device.

A supplementary valve disk 25 is mounted on the spindle 12 between the threaded portion 27 and the stem 30 as is best shown in Figs. 1 and 4. The relative positions of the disks 24 and 25 for the assembled positions of the spindles 11 and 12 is shown in Fig. 1, wherein the main disk 24 is positioned on the primary valve seat 21, thereby closing the valve. It is obvious that rotation of the spindles 11 and 12 will operate to unseat the disk 24 and continuous rotation will carry the spindles 11 and 12 to a point where a shoulder 32, which is suitably formed on the spindle 11, will contact with the hood 14 and stop further rotation. The contact of the shoulder 32 with the hood 14 marks the extreme movement of the valve disk 24 away from its seat 21 when the hood 14 is mounted in position as shown. The distance of the shoulder 32 from the wall of the hood 14 is so regulated that the valve disk 25 is at some distance away from the supplementary valve seat 22 when such contact occurs and the valve 25 is thereby retained in open position when the hood is in position as shown.

When it is desired to have the supplementary valve disk 25 moved to contact with the supplementary valve seat 22, the hood 14 is removed by loosening the screw bolts 17 and detaching the wheel 33 from the spindle 11. Upon removal of the hood 14 the wheel 33 may be remounted on the spindle 11 and further rotation of the spindle accomplished. Such rotation may be continued until the valve disk 25 is positioned on the seat 22 and the valve be thereby closed. The dotted lines of Fig. 1 show this closed position of the valve with the disk 25 in contact with the seat 22, the spindle 12 having been removed by its rotation to the position where the cap member 31 is near the upper edge of the casing 10. The spindle 11 may be detached from the spindle 12 at this point by unthreading the bonnet 13 from the casing 10. The cap member 31 has sufficient freedom of movement in the slot 29 that lateral movement of the spindle 11 disengages the cap member from the slot and permits the spindle to be removed. The disk 24 and the stem unit 23 are thus removed with the spindle 11, and the disk can either be ground or replaced, as desired. After removal of the valve stem 11 and the disk 24 the bonnet 13 can be remounted on the casing 10, and, if desired, the hood 14 may be again mounted in position. In this reassembly of the device with spindle 11 removed it will be seen that the valve is closed by the functioning of the valve disk 25 while the necessary repairs or renewals are being made to the disk 24. After such repairs or renewals, the spindle 11 on which the disk 24 is mounted can again be attached to the spindle 12 by removing the bonnet 13 and the hood 14 and hooking the cylindrical member 28 over the cap member 31 with the latter in position in the slot 29.

Thus it will be seen that I have provided a valve mechanism comprising a primary valve seat and disk cooperating with a supplementary valve seat and disk so mounted as to permit the supplementary valve seat and disk to be in control upon removal of the main valve disk for repairs or renewal.

Having thus described my invention, it is obvious that various immaterial modifications may be made in the same without departing from the spirit of my invention; hence I do not wish to be understood as limiting my- self to the exact form, construction, arrangement and combination of parts herein shown and described, or uses mentioned.

What I claim as new and desire to secure by Letters Patent is:

1. In valve mechanism a casing, a diaphragm in the casing forming a double faced valve seat, a two section stem extending through the diaphragm, one of said stem sections having a threaded connection with the casing and the other projecting through the opposite wall of the casing, a pair of spaced apart valve disks mounted one on each of said sections and on opposite sides of said diaphragm, means for manually rotating the stem, and a removable stop member operable to limit the rotation of the valve stems, said disks being so positioned on their respective stem sections that only one disk is operable to open and close the valve when said stop member is in position, both disks being operable to open and close the valve when said stop is removed, and means for disconnecting said stem sections when the lowermost disk is in a position to close the valve.

2. In valve mechanism a casing, a diaphragm in the casing, a two section stem extending through the diaphragm, one of said sections projecting from the casing and the other having a threaded connection with the casing, means for forming a joint detachably connecting said sections, a detachably mounted bonnet member forming a fluid tight mounting for the projecting stem section, a valve disk on the projecting stem section operable upon rotation of the stem to open and close the valve, a second disk mounted on the other stem section, and a detachably mounted hood member positioned to form a stop limiting the rotation of the stem to prevent said second disk closing the valve.

3. In valve mechanism a casing, a diaphragm in the casing, a two section stem extending through the diaphragm, one of said sections projecting from the casing and the other having a threaded connection with the casing, means for forming a joint detachably connecting said sections, a detachably mounted bonnet member forming a fluid tight mounting for the projecting stem section, a valve disk on the projecting stem section operable upon rotation of the stem to open and close the valve, a second disk mounted on the other stem section, and a detachably mounted hood member positioned to form a stop limiting the rotation of the stem to prevent said second disk closing the valve, said stem being rotatable upon removal of the hood member to cause said second disk to close the valve.

4. In valve mechanism a casing, a diaphragm in the casing, a two section stem extending through the diaphragm, one of said sections projecting from the casing and the other having a threaded connection with the casing, means for forming a joint detachably connecting said sections, a detachably mounted bonnet member forming a fluid tight mounting for the projecting stem section, a valve disk on the projecting stem section operable upon rotation of the stem to open and close the valve, a second disk mounted on the other stem section, and a detachably mounted hood member positioned to form a stop limiting the rotation of the stem to prevent said second disk closing the valve, said stem being rotatable upon removal of the hood member to cause said second disk to close the valve, said joint means being arranged to permit the projecting stem section to be detached and removed from the casing upon removal of said hood and bonnet members.

In testimony whereof, I have hereunto signed my name.

GUY S. FABER.